US010381758B1

(12) United States Patent
Scanlon

(10) Patent No.: US 10,381,758 B1
(45) Date of Patent: Aug. 13, 2019

(54) BREAKOUT BOARD

(71) Applicant: Deep In The Mines LLC, Myrtle Beach, SC (US)

(72) Inventor: Matthew Ryan Scanlon, Myrtle Beach, SC (US)

(73) Assignee: DEEP IN THE MINES LLC, Myrtle Beach, SC (US)

( * ) Notice: Subject to any disclaimer, the term of this patent is extended or adjusted under 35 U.S.C. 154(b) by 52 days.

(21) Appl. No.: 15/994,039

(22) Filed: May 31, 2018

Related U.S. Application Data

(60) Provisional application No. 62/646,757, filed on Mar. 22, 2018.

(51) Int. Cl.
*H01R 12/70* (2011.01)
*G06Q 20/06* (2012.01)
*H01R 12/72* (2011.01)
*H01R 31/06* (2006.01)
*H01R 12/71* (2011.01)

(52) U.S. Cl.
CPC ....... *H01R 12/7076* (2013.01); *G06Q 20/065* (2013.01); *H01R 12/7088* (2013.01); *H01R 12/716* (2013.01); *H01R 12/722* (2013.01); *H01R 31/065* (2013.01)

(58) Field of Classification Search
CPC . H01R 12/7076; H01R 12/722; G06Q 20/065
See application file for complete search history.

(56) References Cited

U.S. PATENT DOCUMENTS 6,203,333 B1 * 3/2001 Medina .............. H01R 13/6658
439/465
6,554,639 B2 * 4/2003 Doriski, Jr. .......... H01R 25/003
439/498

(Continued)

FOREIGN PATENT DOCUMENTS

CN 104122803 A * 10/2014
WO WO 2015186960 A1 * 12/2015 ......... H01R 12/7082

OTHER PUBLICATIONS

Taylor,"The evolution of Bitcoin Hardware," 2017, Computer, vol. 50, Issue 9, pp. 58-66.*

(Continued)

*Primary Examiner* — Pinping Sun
(74) *Attorney, Agent, or Firm* — John Maldjian; Maldjian Law Group LLC

(57) ABSTRACT

A breakout board for interfacing a power supply unit (PSU) with one or more devices, the PSU providing power to the devices and comprising a plurality of pins having functions, the breakout board having a body including conductive tracks; a slot connector having first and second pluralities of pin receivers disposed on the body, wherein, when the PSU is inserted into the slot connector, the pin receivers couple to the corresponding pins of the PSU; a plurality of bundle connectors disposed on the body for relaying the power from the PSU to the devices, each of the bundle connectors having first and second pluralities of single connectors, wherein the pin receivers are coupled directly to the respective single connectors on each of the bundle connectors; and wherein after an interruption, power from the PSU to the devices is restored instantaneously without requiring manual intervention.

15 Claims, 6 Drawing Sheets

(56) References Cited

U.S. PATENT DOCUMENTS

| | | | | |
|---|---|---|---|---|
| 6,629,184 B1* | 9/2003 | Berg | G06F 3/0622 | 710/305 |
| 6,659,803 B1* | 12/2003 | Chen | G06F 1/184 | 439/638 |
| 7,442,076 B2* | 10/2008 | Huang | H01R 13/641 | 439/188 |
| 8,203,828 B2* | 6/2012 | Bornhorst | H04B 3/54 | 361/601 |
| 9,223,371 B2* | 12/2015 | Lorentzen | G06F 1/263 | |
| 2001/0033502 A1* | 10/2001 | Blair | H02J 7/0022 | 363/65 |
| 2005/0026472 A1* | 2/2005 | Lee | H01R 12/7029 | 439/79 |
| 2008/0227306 A1* | 9/2008 | Chi | H01R 9/096 | 439/65 |
| 2009/0073641 A1* | 3/2009 | Ross | H02J 7/0044 | 361/626 |
| 2012/0105096 A1* | 5/2012 | Kuah | G01R 31/2812 | 324/763.01 |
| 2015/0378415 A1* | 12/2015 | George | G06F 1/30 | 307/64 |
| 2016/0043555 A1* | 2/2016 | Howell | G06F 1/263 | 307/23 |
| 2016/0149351 A1* | 5/2016 | Jones | H01R 13/70 | 307/115 |

OTHER PUBLICATIONS

S-union,"S-union Ethereum ZEC PSU/GPU breakout Board for HP 1200w/750w Power supply:DSP-1200FB DPS-750RB DL580. GPU open Rig Mining Ethereum ZEC ZCASH ETH devices," Dec. 4, 2017, pp. 1-7.*

S-union,"S-union Ethereum ETH ZEC Mining GPU 1200w/750w PSU breackout Board 12V for DPS-1200FB DPS-1200QB PS-2751-5Q HSTSN-PL12 DPS-700LB PS-2112-5L DPS-750RB DL580 Series ( with Power Button)," Nov. 20, 2017, pp. 1-12.*

AntMiner,"Antminer S9 installation guide," Jun. 2016, v 0.1,pp. 1-15.*

* cited by examiner

BREAKOUT BOARD

CROSS-REFERENCE TO RELATED APPLICATIONS

This application claims the benefits of, and priority to, U.S. Provisional Application Ser. No. 62/646,757, filed Mar. 22, 2018, entitled "BREAKOUT BOARD", which is incorporated herein by reference in its entirety.

FIELD OF THE INVENTION

Embodiments of the present invention generally relate to a breakout board, and in particular relate to a breakout board for coupling a power supply device having a processing device.

BACKGROUND

Bitcoin is a type of digital crypto-currency used in peer-to-peer transactions. The use of Bitcoin in transactions may eliminate the need for intermediate financial institutes because Bitcoin may enforce authenticity and user anonymity by employing digital signatures. Bitcoin resolves the "double spending" problem (namely, using the same Bitcoin more than once by a same entity in different transactions) using block chaining, wherein a public ledger records all the transactions that occur within the Bitcoin currency system. Every block added to the block chain validates a new set of transactions by compressing a 1024-bit message, which includes a cryptographic root (e.g., the Merkle root) of the transaction along with bits representing other information such as, for example, a time stamp associated with the transaction, a version number, a target, a hash value of the last block in the block chain and a nonce. In particular, each block includes a Secure Hash Algorithm 256 (SHA-256) cryptographic hash of the last block. The process of validating transactions and generating new blocks of the block chain is commonly referred to as Bitcoin mining.

The process of Bitcoin mining is designed to allow the system to come to a consensus in which all nodes in a computer network agree to the same block chain. According to the Bitcoin protocol, the first miner to successfully compute a valid proof-of-work for a block candidate is entitled to add the block to the block chain, and to generate new units of the crypto-currency as a reward. The proof-of-work for a block consists of a nonce value that, when inserted into a designated field in the block, makes the cryptographic hash value of the block meet a certain difficulty target.

Bitcoin mining is typically competitive in nature due to the reward involved. Further, the mining difficulty also increases with time. The competitive and difficult nature of Bitcoin mining has led to the use of processing circuitry designed specifically for Bitcoin mining. Such processing circuitry also requires a dedicated power supply unit. The processing circuitry and power supply unit are generally expensive. Interfacing the processing circuitry with the power supply unit may also require a Printed Circuit Board (PCB) having a number of complex and relatively expensive components. Individual components of the PCB may further be susceptible to failure, thereby reducing the life of a PCB.

Further, the processing circuitry needs to ideally operate without interruption in order to mine effectively. However, in case of any interruption in power, a user is required to manually press a button on the PCB to restore power to the processing circuitry. In cases where the user is located remotely, such manual intervention is not possible immediately, thereby resulting in downtime and thus loss production.

Accordingly, it is desirable to provide a board that is relatively inexpensive and requires no manual intervention in case of a power failure.

SUMMARY

Presented is a breakout board for interfacing a power supply unit (PSU) with one or more devices, the PSU providing power to the one or more devices and comprising a plurality of pins having functions, the breakout board having a body including conductive tracks; a slot connector having first and second pluralities of pin receivers disposed on the body, wherein, when the PSU is inserted into the slot connector, the first and second pluralities of pin receivers couple to the corresponding plurality of pins of the PSU; a plurality of bundle connectors disposed on the body for relaying the power from the PSU to the one or more devices, each of the plurality of bundle connectors having first and second pluralities of single connectors, wherein the first and second pluralities of pin receivers are coupled directly to the respective first and second pluralities of single connectors on each of the bundle connectors; and wherein, after an interruption, power from the PSU to the one or more devices is restored instantaneously without requiring manual intervention.

Also presented is a breakout board for interfacing a power supply unit (PSU) with one or more devices, the PSU providing power to the one or more devices and comprising a plurality of pins having functions, the breakout board having a body including conductive tracks; a slot connector having first and second pluralities of pin receivers disposed on the body, the first plurality of pin receivers corresponds to a first set of the plurality of pins on the PSU having power-on, power-off and ground functions, and the second plurality of pin receivers corresponds to a second set of the plurality of pins having functions of putting the PSU into a stand-by mode, wherein when the PSU is attached to the slot connector the first and second pluralities of pin receivers couple to the corresponding plurality of pins of the PSU; a plurality of bundle connectors disposed on the body for relaying the power from the PSU to the one or more devices, each of the plurality of bundle connectors having first and second pluralities of single connectors, wherein the first and second pluralities of pin receivers are coupled directly to the respective first and second pluralities of single connectors on each of the bundle connectors; a second slot connector disposed on the body for interfacing a second PSU; and a switch disposed on the body and coupled to the second set for switching the PSU between the stand-by mode and providing power, wherein when the power is supplied from the PSU, after an interruption, power from the PSU to the one or more devices is restored instantaneously without requiring manual intervention.

The preceding is a simplified summary to provide an understanding of some embodiments of the present disclosure. This summary is neither an extensive nor exhaustive overview of the present disclosure and its various embodiments. The summary presents selected concepts of the embodiments of the present disclosure in a simplified form as an introduction to the more detailed description presented below. As will be appreciated, other embodiments of the present disclosure are possible, utilizing, alone or in combination, one or more of the features set forth above or described in detail below.

BRIEF DESCRIPTION OF THE DRAWINGS

So the manner in which the above recited features of the present embodiments may be understood in detail, a more particular description of embodiments of the present invention, briefly summarized above, may be had by reference to embodiments, several of which are illustrated in the appended drawings.

The above and still further features and advantages of the present disclosure will become apparent upon consideration of the following detailed description of embodiments thereof, especially when taken in conjunction with the accompanying drawings, wherein like reference numerals in the various figures are utilized to designate like components, and wherein.

Figure 1:
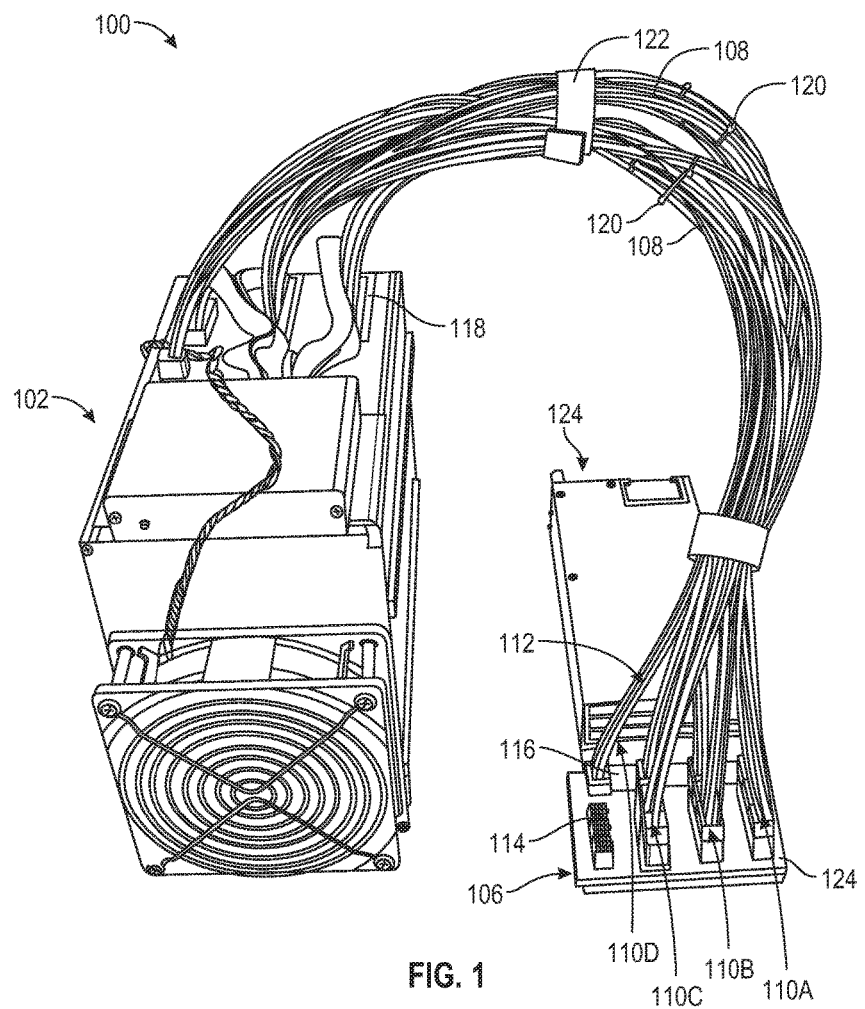
FIG. 1 illustrates a perspective view of a breakout board coupling a processing device to a power supply unit, in accordance with an embodiment of the present invention.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the particular form disclosed, but to the contrary, the present disclosure is to cover all modifications, equivalents and alternatives falling within the spirit and scope of embodiments of the present disclosure.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

It will be noted, throughout the appended drawings, like features are identified by like reference numerals.

DETAILED DESCRIPTION

In the following detailed description, numerous specific details are set forth in order to provide a thorough understanding of embodiments or other examples described herein. In some instances, well-known methods, procedures, components and circuits have not been described in detail, so as to not obscure the following description.

Further, the examples disclosed are for exemplary purposes only and other examples may be employed in lieu of, or in combination with, the examples disclosed. It should also be noted the examples presented herein should not be construed as limiting of the scope of embodiments of the present disclosure, as other equally effective examples are possible and likely.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Embodiments of the present disclosure provide a multi-functional power breakout board that transmits power from a power supply device to various types of processing devices, such as Bitcoin miners and computer graphic cards.

FIG. 1 illustrates a system 100, in accordance with an embodiment of the present invention. The system 100 may be used for mining block chains related to a crypto-currency (for example, Bitcoin), in an embodiment of the present invention. In another embodiment of the present invention, the system 100 may be used for computation or graphics processing. For example, the processing device 102 may be a Graphics Processing Unit (GPU).

As shown in FIG. 1, the system 100 may include a processing device 102, a power supply unit 104 (interchangeably referred to as "power supply device 104") for supplying power to the processing device 102, and a power breakout board 106 (hereinafter referred to as "the breakout board 106") for coupling or interfacing the processing device 102 with the power supply device 104 via multiple cables 108. In an embodiment of the present invention, the breakout board 106 may act as an edge board or card that is slidably coupled to the power supply device 104.

In an embodiment of the present invention, the processing device 102 may be, but is not limited to, Application-Specific Integrated Circuits (ASIC) used for Bitcoin mining, i.e., a Bitcoin miner, hash boards and control boards. The hash boards may include circuitry implementing a cryptographic function (e.g., Secure Hash Algorithm 256) to perform the Bitcoin mining. The control boards may perform various control functions related to the processing device 102. In an exemplary scenario, the processing device 102 may include three hash boards. Each hash board and the control board may require separate power supplies.

In an embodiment of the present invention, the power supply device 104 may be a Lite-On power supply unit. The Lite-On power supply unit may be cheaper than other power supply units, such as a HP™ power supply unit. Further, the breakout board 106, according to the embodiments of the present invention, may enable the Lite-On power supply unit to be coupled to a Bitcoin miner, such as the processing device 102. In another embodiment of the present invention, the power supply device 104 may also be a Dell™ power supply unit. In yet another embodiment of the present invention, the power supply device 104 may be a server power supply unit configured for providing power to servers. Such server power supply units may be cheaper than conventional power supply units that are used for powering Bitcoin miners. In an exemplary scenario, the server power supply unit (e.g., the Lite-On power supply unit) may have a price that is about one-third the price of a conventional power supply unit (e.g., the HP power supply unit). However, server power supply units may not have any in-built provision for interfacing with Bitcoin miners. The breakout board 106, according to the embodiments of the present invention, may provide a suitable interface between server power supply units and Bitcoin miners, thereby providing a cheaper alternative to prior art systems. Further, such server power supply units may be durable and configured to provide continuous power supply. This is suitable for Bitcoin miners as they operate continuously, i.e., 24/7.

In an embodiment of the present invention, the power supply device 104 may include one or more circuits to convert an Alternating-Current (AC) input power to Direct-Current (DC) output power. Further, the power supply device 104 may also include circuitry to safeguard against power surges and fluctuations. In an embodiment of the present invention, the power supply device 104 may have a rated output power in a range from about 1000 Watts to about 1400 Watts. In another embodiment of the present invention, the power supply device 104 may generate an output DC voltage of about 12 Volts.

The breakout board 106 may enable a direct connection between an output power of the power supply device 104 and the cables 108. The cables 108 are arranged into bundles 112 for detachable connection with corresponding bundle connectors 114 of the breakout board 106. In an embodiment of the present invention, each bundle 112 may include six of the cables 108. The breakout board 106 may have six such bundle connectors 114 arranged in a patterns of three rows of four bundle connectors 114 and two rows of four bundle connectors 114, in an embodiment of the present invention. The breakout board 106 may have twelve such bundle connectors 114 arranged in a patterns of three rows of four bundle connectors 114 and four rows of four bundle connectors 114, in another embodiment of the present invention. However, the bundle connectors 114 may be arranged in any alternative configuration on the breakout board 106.

Further, the bundles 112 may be arranged into the four groups 110A-D. Each of the groups 110A-C may include three of the bundles 112, while the group 110D may include a single bundle 112. The groups 110A-C may provide power to the three hash boards, respectively, of the processing device 102. Further, the group 110D may provide power to the control board of the processing device 102. The unused bundle connectors 114 (two in this case) may be used for any other type of processing device. In another embodiment of the present invention, the breakout board 106 may have sixteen of the bundle connectors 114. Each of the bundle connectors 114 may include six single connectors.

Further, each bundle 112 may comprise a six-pin Peripheral Component Interconnect (PCI) express cable 108. Each of the cables 108 may include an outer covering that at least partially encloses one or more wires. In an embodiment of the present invention, each of the cables 108 may be PCI compliant cable. Further, each bundle 112 may include a cable connector 116 at one end for coupling with the corresponding bundle connector 114 of the breakout board 106. In an embodiment of the present invention, each of the cables 108 of the bundles 112 may include cable connectors 116 provided at both ends. In an embodiment of the present invention, the cable connector 116 may be a female connector. In another embodiment of the present invention, the bundle connector 114 of the breakout board 106 may be a male connector. In yet another embodiment of the present invention, the bundle connector 114 may include six single male connectors, while the cable connector 116 may include six single female connectors. The cable connector 116 at one of the ends is configured to be detachably coupled to the corresponding bundle connector 114 of the breakout board 106.

The cables 108 are further connected to corresponding processing connectors 118 of the processing device 102. In an embodiment of the present invention, at least one of the processing connectors 118 may be a socket connector. In a further embodiment of the present invention, three of the processing connectors 118 may be provided for the three hash boards, respectively. Moreover, one of the processing connectors 118 may be provided for the control board of the processing device 102. Further, each bundle 112 is provided with a bundle fastener 120 for coupling the corresponding cables 108 to each other. Examples of the bundle fastener 120 may include, but is not restricted to, a cable tie, a twist tie, a rapstrap fastener, and so forth. Further, the bundles 112 are arranged into a harness by fasteners 122. Example of the fasteners 122 may include, but is not restricted to, hook and loop fasteners.

The bundle connectors 114 may be arranged on a body 124 of the breakout board 106. In an embodiment of the present invention, the body 124 of the breakout board 106 may be a Printed Circuit Board (PCB) that defines the electrical connections between the various components. The body 124 may be made of a non-conductive substrate (for example, plastic) and may include various components, such as, but not restricted to, conductive tracks, conductive pads, and the like. The body 124 may be single-sided or double-sided. Further, the body 124 may include through holes (not shown) for receiving the bundle connectors 114. In an embodiment of the present invention, the bundle connectors 114 may be mechanically connected to the body 124. In another embodiment of the present invention, electrical components (for example, conductive pads) of the bundle connectors 114 may be electrically connected to conductive tracks of the body 124. In an embodiment of the present invention, the electrical components of the bundle connectors 114 may be soldered to the conductive tracks. In another embodiment of the present invention, the body 124 may include foam insulation at a bottom to prevent any short-circuit.

Further, an edge slot connector 126 (hereinafter referred to as "the slot connector 126") is provided at an edge of the body 124. Further, the slot connector 126 is configured to be slidably connected to the power supply device 104. In an embodiment of the present invention, the slot connector 126 is detachably coupled to a gold edge (not shown in FIG. 1) of the power supply device 104.

In an embodiment of the present invention, at least two slot pin receivers of the slot connector 126 may be directly connected to the bundle connectors 114 without going through a switch. Power is automatically supplied to the processing device 102 after assembling the system 100 and providing suitable input power to the power supply device 104. Therefore, in the event of a power failure and subsequent restoration of power, power to the processing device 102 automatically turns back on without the need for a restart button. Therefore, there is no requirement for manual intervention in order to restore power to the processing device 102 after a power failure. Specifically, the breakout board 106, of the present disclosure, obviates the need to press a restart button to restore power to the processing device 102. As such, power is automatically provided to the processing device 102 in case power to the power supply device 104 goes off and then on. In an exemplary scenario, when the breakout board 106 is used for Bitcoin mining, and a user is located remotely from the system 100. Specifically, then the user does not have to travel to a location of the system 100 and switch on the restart button manually. Bitcoin mining can therefore occur continuously (i.e., 24/7) without any manual intervention.

To assemble the system 100, the user may slidably couple the breakout board 106 with the power supply device 104. The user may also couple the cables 108 with the corresponding bundle connectors 114 of the breakout board 106 and the corresponding processing connectors 118 of the processing device 102. The power supply device 104 may be provided power from a mains supply. Once the power supply device 104 receives power, the processing device 102 is automatically provided with power via the breakout board 106 and the cables 108.

Figure 2:
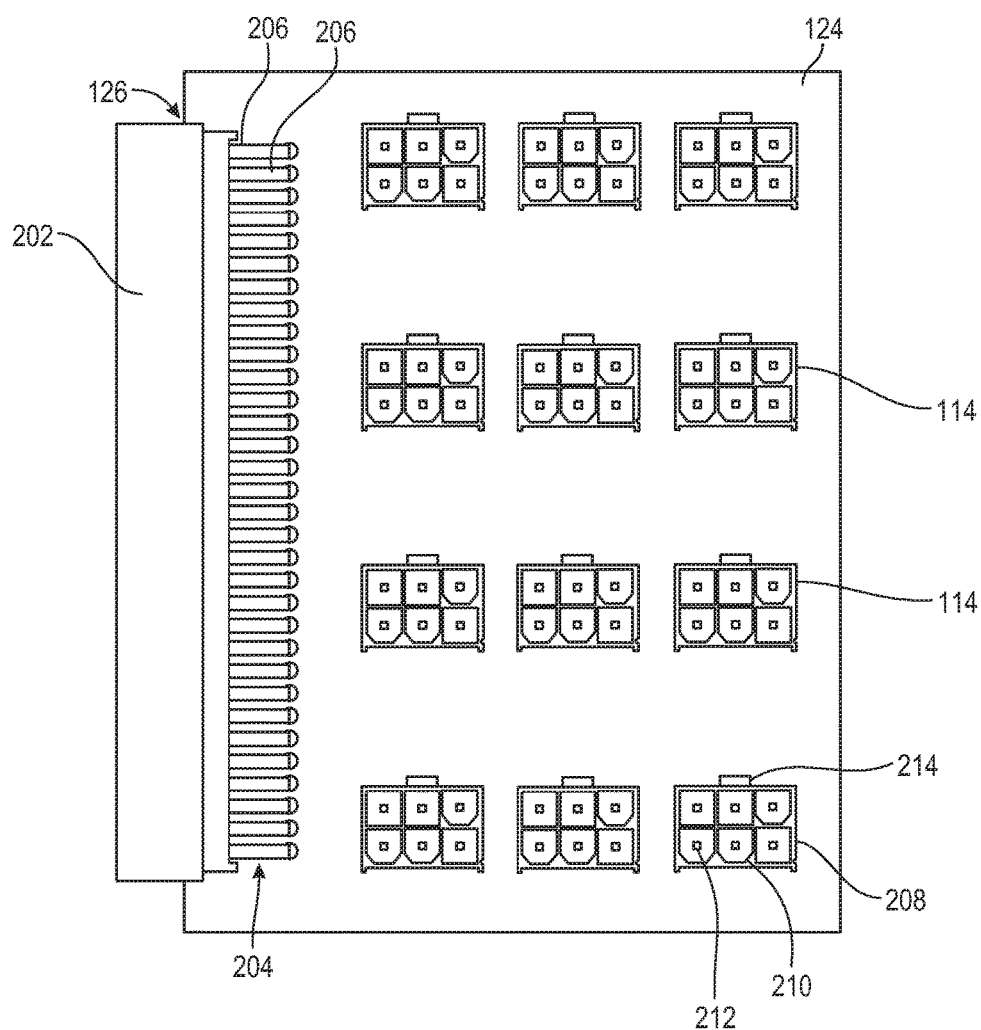
FIG. 2 illustrates a top view of the breakout board, in accordance with an embodiment of the present invention.

FIG. 2 illustrates a top view of the breakout board 106, according to an embodiment of the present invention. As discussed above, the bundle connectors 114 and the slot connector 126 may be coupled to the body 124. The slot connector 126 may include a slot housing 202 that is disposed substantially parallel to an edge of the body 124. The slot housing 202 may be slidably coupled to an edge connector of the power supply device 104. Further, the slot housing 202 may be attached to the body 124 of the breakout board 106 via various methods, for example, adhesives, soldering, mechanical joints, and so forth. The slot connector 126 may further include at least one row 204 of slot pin receivers 206. In an embodiment of the present invention, the slot connector 126 may include two rows of slot pin receivers 206 parallel to each other. The slot pin receivers 206 may be electrically coupled to a gold edge of the power supply device 104. In an embodiment of the present invention, each of the row 204 of the slot connector 126 may include thirty-two slot pin receivers 206.

Further, the bundle connectors 114 may be arranged in a 3×4 array configuration on the breakout board 106, as shown in FIG. 2. However, the bundle connectors 114 may be arranged in any alternative configuration on the breakout board 106. Each of the bundle connector 114 may include a connector housing 208 that may be received within a corresponding through hole (not shown) of the body 124. Further, the connector housing 208 may be coupled to the body 124 via various methods, for example, adhesives, soldering, mechanical joints, and so forth. In an embodiment of the present invention, the connector housing 208 may include one or more partitions to form six single connectors 210. The single connectors 210 in each of the bundle connector 114 may be arranged in an array of 3×2, in an embodiment of the present invention. Each of the six single connector 210 may include a conductive pad 212. In an embodiment of the present invention, at least two of the slot pin receivers 206 may be electrically coupled to conductive pads 212 of the bundle connector 114 of the breakout board 106. The conductive pad 212 of each of the bundle connectors 114 are also configured to be electrically coupled with one or more components (not shown) of the corresponding cable connector 116.

Further, the connector housing 208 may include a projection 214 that is configured to be detachably coupled with a corresponding detent (not shown) of the cable connector 116. The coupling between the projection 214 and the detent may secure the cable connector 116 to the bundle connector 114.

Figure 3:
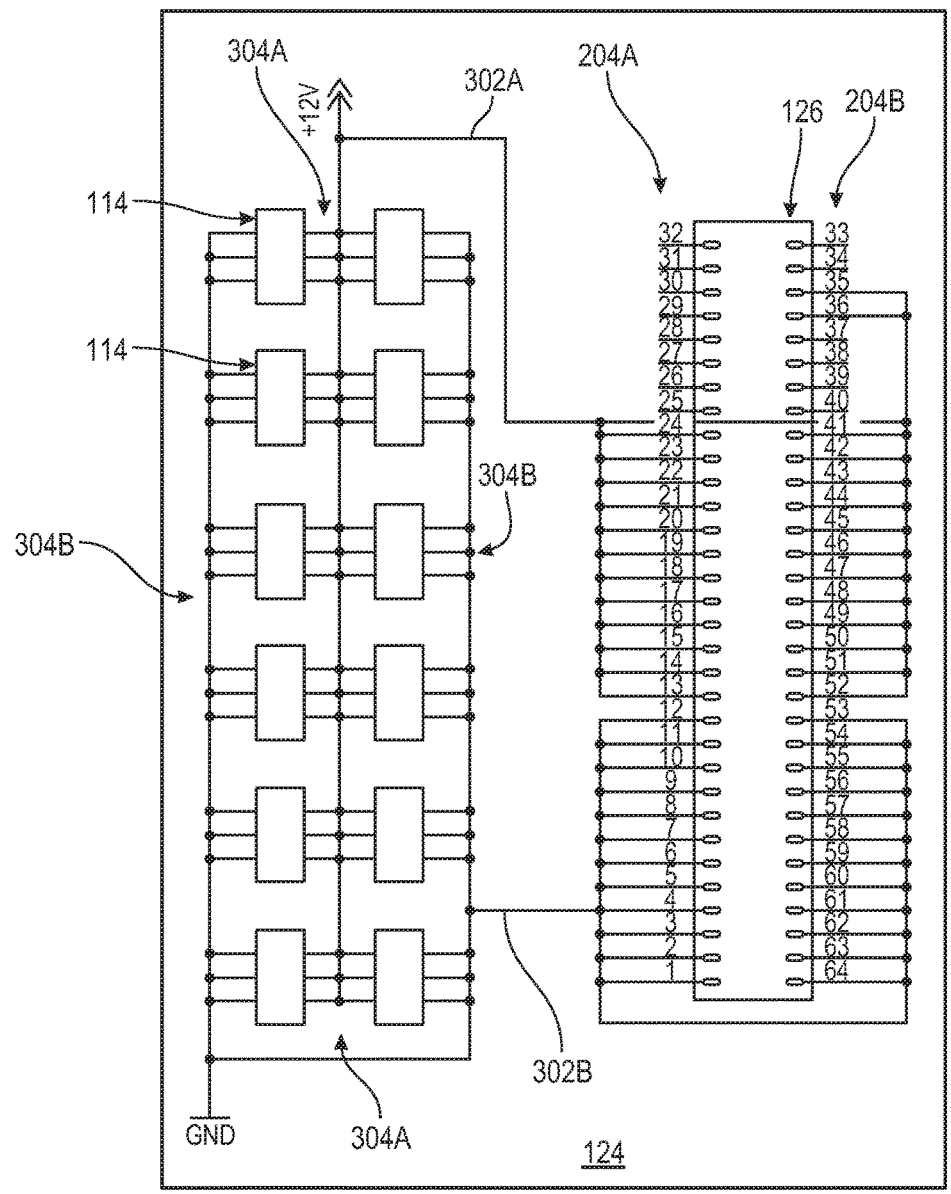
FIG. 3 illustrates a schematic view of the breakout board, in accordance with an embodiment of the present invention.

FIG. 3 illustrates a schematic view of the breakout board 106, according to an embodiment of the present disclosure. The slot connector 126 includes a first row 204A of slot pin receivers and a second row 204B of slot pin receivers. Each of the first and second rows 204A and 204B may include thirty-two slot pin receivers 206. The first row 204A may include slot pin receivers 1 to 32, while the second row 204B may include slot pin receivers 33 to 64. Further, slot pin receivers 13 to 23 of the first row 204A and slot pin receivers 35, 36 and 41 to 52 of the second row 204B may be electrically connected to the bundle connectors 114 via a first conductive connection 302A. The first conductive connection 302A may represent conductive traces, soldered connections, or a combination thereof. In an embodiment of the present invention, the first conductive connection 302A may provide a positive DC voltage of 12 volts to the bundle connectors 114. The slot pin receivers 1 to 12 of the first row 204A and the slot pin receivers 53 to 64 of the second row 204B may be electrically connected to the bundle connectors 114 via a second conductive connection 302B. The second conductive connection 302B may represent conductive traces, soldered connections, conductive pads, or a combination thereof. In an embodiment of the present invention, the second conductive connection 302B may electrically connect the bundle connectors 114 to ground. In the illustrated embodiment, three of the conductive pads of each of the bundle connectors 114 may be electrically connected to the first conductive connection 302A, while the other three conductive pads of each of the bundle connectors 114 may be electrically connected to the second conductive connection 302B. Specifically, the first conductive connection 302A may be connected to three conductive pads of each of the bundle connectors 114 via a first set 304A of connections. Further, the second conductive connection 302B may be connected to the other three conductive pads of each of the bundle connectors 114 via a second set 304B of connections. Therefore, the three conductive pads of each of the bundle connectors 114 is provided with a positive DC voltage of 12 volts, as received from the power supply device 104 (shown in FIG. 1). Further, the other three conductive pads of each of the bundle connectors 114 is biased to the ground. In an embodiment of the present invention, the ground may be determined by the power supply device 104. Consequently, three conductive pads of each of the bundle connectors 114 may provide positive DC voltage of 12 volts to the corresponding cables 108 (shown in FIG. 1) electrically connected to them. Moreover, the other three conductive pads of each of the bundle connectors 114 may provide a ground voltage to the corresponding cables 108 electrically connected to them. It may be apparent to a person having ordinarily skilled in the art that certain slot pin receivers of the slot connector 126 may be directly connected to the bundle connectors 114 without any intermediate switches. Therefore, upon coupling the power supply device 104 to the slot connector 126, and the cables 108 to the bundle connectors 114 and the processing device 102, the power supply device 104 may provide electrical power to the processing device 102 via the breakout board 106. Due to the absence of any intermediate switches (such as, restart buttons), power to the processing device 102 may be automatically turned back on in the event of a power failure and subsequent restoration of power. Further, in the absence of expensive and complicated components (such as, LED indicators) that can potentially malfunction, the breakout board 106 may be cost efficient and reliable.

Figure 4:
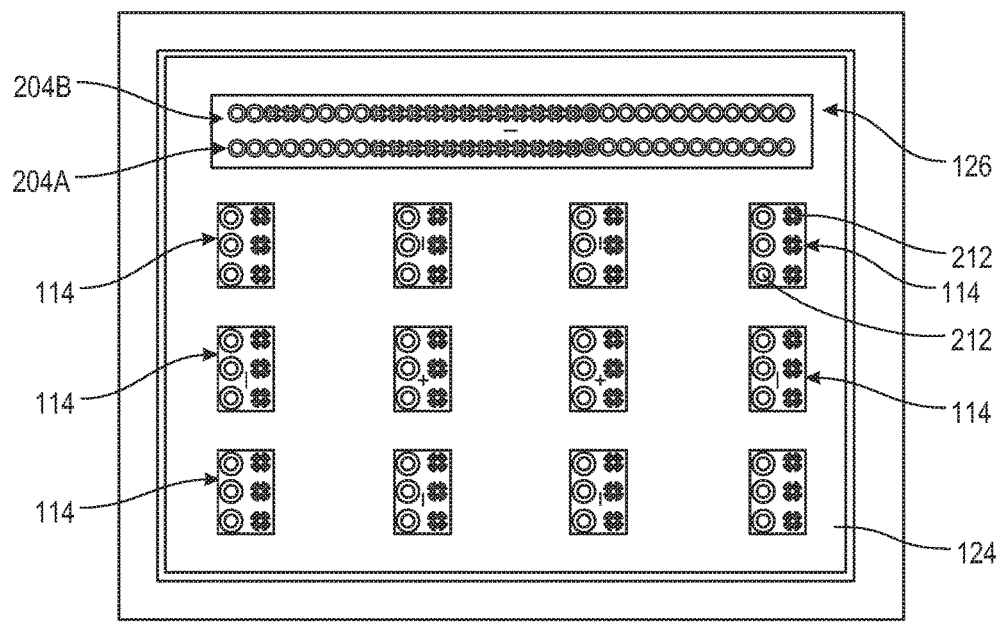
FIG. 4 illustrates a top layout of the breakout board, in accordance with an embodiment of the present invention.

FIG. 4 illustrates a top layout of the breakout board 106, according to an embodiment of the present invention. The slot connector 126 of the breakout board 106 may include the first row 204A and the second row 204B of the slot pin receivers 206. Each of the first row 204A and the second row 204B may include 32 slot pin receivers 206.

Further, twelve of the bundle connectors 114 are arranged in an array of 3×4. Each of the bundle connectors 114 may include six conductive pads 212. Three of the six conductive pads 212 of each of the bundle connectors 114 may be biased at 12 volts DC. Further, three of the six conductive pads 212 of each of the bundle connectors 114 may be grounded. Further, the slot connector 126 and the bundle connectors 114 are disposed on the body 124 of the breakout board 106.

Figure 5A:
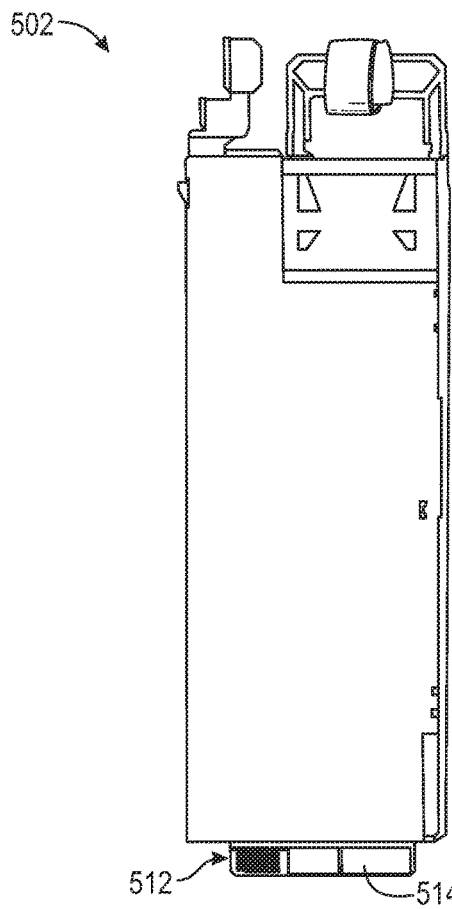
FIGS. 5A and 5B illustrate a top view of a breakout board and power supply device respectively, in accordance with another embodiment of the present invention.
Figure 5B:
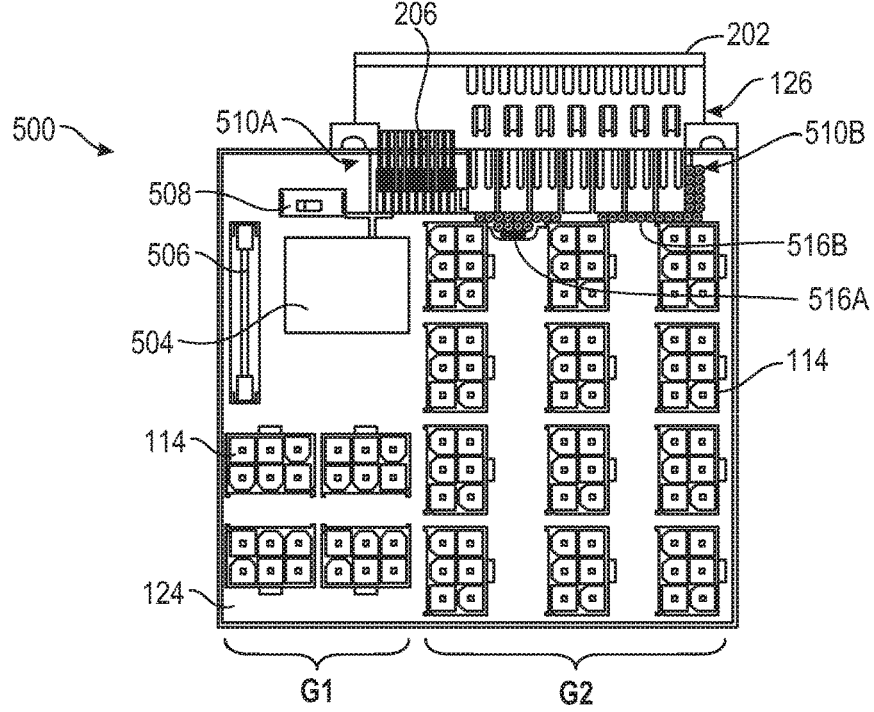

FIGS. 5A and 5B illustrate a top view of a breakout board 500 and a power supply device 502, according to another embodiment of the present invention. The breakout board 500 may include a plurality of bundle connectors 114, a relay 504, a Serial Advanced Technology Attachment (SATA) power connector 506 (hereinafter after referred to as "the SATA power connector 506"), a slider switch 508, and an edge slot connector 126 disposed on the body 124. In an embodiment of the present invention, each of the bundle connectors 114 may be configured to receive one of the cable connector 116 attached at one end of the bundle 112. In some embodiments of the present invention, the bundle connectors 114 may be divided into two groups "G1" and "G2". The group "G1" may include twelve bundle connectors 114 arranged in a 3×4 array. The group "G2" may include four bundle connectors 114 arranged in a 2×2 array. In another embodiment of the present invention, the groups "G1" and "G2" may include any suitable number of the bundle connectors 114 arranged in a suitable configuration, as per requirements. Therefore, the breakout board 500 may include sixteen bundle connectors 114. Each of the bundle connectors 114 may include six single connectors configured to be coupled with a six-pin PCI express cable. The PCI express cable may transmit power to a processing device, for example, a Bitcoin miner or a GPU. Further, the bundle connectors 114 may be used for coupling or interfacing the processing device 102 (shown in FIG. 1) with the power supply device 502 via one or more bundles 112 of cables 108.

Further, the breakout board 500 may include the relay 504 for use with the power supply device 502. The relay 504 may be an electrically operated switch configured to use with dual power supplies. The relay 504 may include five pins, in an embodiment of the present invention. One of the pins of the relay 504 is connected to the power supply device 502 via the slider switch 508. In an embodiment of the present invention, the relay 504 may be a 5V relay. The relay 504 may be electrically connected to the SATA power connector 506 and at least one of the slider switch 508 and the edge slot connector 126, in an embodiment of the present invention.

In an embodiment of the present invention, the SATA power connector 506 may be a fifteen pin power connector. The SATA power connector 506 may be used for dual on use power supply system. The SATA power connector 506 may supply power to the breakout board 500 from a normal or an Advanced Technology EXtended (ATX) desktop computer power supplies (not shown). In an embodiment of the present invention, a desktop computer power supply may supply power via three 5V power pins of the SATA power connector 506. In some embodiments of the present invention, the power supplied to the SATA power connector 506 may be provided to the relay 504. In an embodiment of the present invention, the SATA power connector 506 may have lead out output voltages of +12V, +5V, and +3.3V.

In some embodiments of the present invention, the slider switch 508 may be slidable between two position to switch between different power supplies. In an embodiment of the present invention, a first position of the slider switch 508 may be indicative of "AUTO ON" mode which may allow the power supply device 502 to supply power to the breakout board 500. During "AUTO ON" mode, the breakout board 500 may be automatically turned on if power is interrupted, then restored. In some embodiments of the present invention, the "AUTO ON" mode may be used when mining is performed using ASIC. In an embodiment of the present invention, a second position of the slider switch 508 may be indicative of "SATA ON" mode which may allow the desktop computer power supply to supply power to the breakout board 500 via the SATA power connector 506. In an exemplary scenario, the "SATA ON" mode may be used for graphic card (GPU) mining. In an embodiment of the present invention, the "SATA ON" mode may allow a user to connect a regular desktop computer to a server power supply to the breakout board 500 and allow the server power supply to power on and off simultaneously. Further, the "SATA ON" mode may enhance the safety of the system 100 by preventing the server power supply from being on and providing a 12V output to the graphics cards while the desktop power supply or computer is not on.

In an embodiment of the present invention, the slider switch 508 may allow switching in a dual power supply mode. In an exemplary scenario, the slider switch 508 may be used for dual supply mode. The slider switch 508 may include three terminals. One of three terminals of the slider switch 508 may be connected to the relay 504. Also, the breakout board 500 may include written indication indicative of mode to be selected based on a position of the slider switch 508. The two modes are "SATA ON" and "AUTO ON" mode. The slider switch 508 may be slidably moved for either "AUTO ON" mode or "SATA ON" mode for use with dual supplies. The SATA power connector 506 may include 15 pins for dual on use with normal or "ATX" desktop computer power supply. In some embodiments of the present invention, three 5V pins of the SATA power connector 506 are connected to one of the pins of the relay 504 to supply power from a desktop computer power supply to the relay 504. In some other embodiments of the present invention, six ground pins of the SATA power connector 506 may be connected to one pin of the relay 504. In some embodiments of the present invention, at least one of the ground pins of the SATA power connector 506 may supply a ground connection to the relay 504 for the "SATA ON" mode.

As shown, the edge slot connector 126 is provided at an edge of the body 124. The slot connector 126 may include the slot housing 202 that is disposed substantially parallel to the edge of the body 124. Further, the slot housing 202 may be attached to the body 124 of the breakout board 500 via various methods, for example, adhesives, soldering, mechanical joints, and so forth. The slot connector 126 may include two sets 510A and 510B of slot pin receivers 206. In an exemplary scenario, the first set 510A may include ten slot pin receivers 206 and the second set 510B may include seven pair of slot pin receivers 206.

In an exemplary scenario, the body 124 of the breakout board 500 may include corresponding conductive pads for each of the slot pin receivers 206 of the first set 510A. In some embodiments of the present invention, at least two slot pin receivers 206 may be used for the power supply device 502 in standby mode. In an embodiment of the present invention, at least one of the slot pin receiver 206 may connect the power supply device 502 to the slider switch 508 along with the relay 504 for use with either "AUTO ON" or "SATA ON" mode when the slider switch 508 is moved dual power supplies. The second set 510B may include seven pair of slot pin receivers 206. In an embodiment of the present invention, three pair of slot pin receivers 206 of the second set 510B may be designated for ground while four pair of slot pin receivers 206 of the second set 510B may be designated for +12V power supply. In some embodiments of the present invention, the power supply device 502 may provide ground connection to the three pairs of slot pin receivers 206 designated for ground via Vertical Interconnect Access (VIA) below the conductive pads. The power supply device 502 may further supply 12V power to the breakout board 500 to the remaining four pairs of slot pin receivers 206 designated for 12V power supply Vertical Interconnect Access (VIA) below the conductive pads. The seven pair of slot pin receivers 206 of the second set 510B may be electrically connected to the breakout board 500 via Vertical Interconnect Access (VIA) below the connecting pads.

In an exemplary scenario, the breakout board 500 may include two sets of Vertical Interconnect Access (VIAs) 516A and 516B. In an exemplary scenario, the first set 516A and second set 516B is connected to ground pins and 12V power pins of the second set of slot pin receivers 510B, respectively. In an embodiment of the present invention, the first set 516A may include seventeen VIAs, disposed below the first set 510A of the slot connector 126. The second set 516B may include twenty one VIAs, disposed below the second set 510B of the slot connector 126. In an embodiment of the present invention, the body 124 may include an alignment slot (not shown) for attachment of the slot connector 126 to the body 124 of the breakout board 500. The alignment slot may allow easy and accurate placement of the slot connector 126 on the body 124.

In an exemplary scenario, four ground connection from the power supply device 502 are connected to three pair of slot pin receivers 206 on the top of the breakout board 500 by use of 17 VIAs of the first set 516A disposed below them. Further, three 12V connection from the power supply device 502 may be connected to four pair of slot pin receivers 206 on the top of the breakout board 500 by use of the 21 VIAs of the second set 516B.

Further, the slot connector 126 is configured to be slidably connected to any of the power supply devices 502. In an embodiment of the present invention, at least two slot pin receivers of the slot connector 126 may be directly connected to the bundle connectors 114 without going through the slider switch 508. Power is automatically supplied to the processing device 102 after assembling the system 100 (shown in FIG. 1) and providing suitable input power to the power supply devices 502.

In an embodiment of the present invention, each of the power supply devices 502 may have similar structural configuration with different power rating. In some embodiments of the present invention, the power supply device 502 may include an edge connector 512. Further, the edge connector 512 may include a gold edge 514. The gold edge 514 may be configured to be slidably coupled with the slot connector 126 of the breakout board 500. In some other embodiments of the present invention, the slot housing 202 of the slot connector 126 may be slidably coupled to the edge connector 512 of one of the power supply devices 502.

In an embodiment of the present invention, the power supply device 502 may be a HP ProLaint Gen9 Flexible Slot Server Power Supply. The flexible slot server power supply may be more efficient than other power supply units. In some embodiments of the present invention, the efficiency rate to the HP flexible slot server power supply lies with a range of 94-96%. In an embodiment of the present invention, the HP flexible slot server power supply may provide high reliability in large scale bitcoin miners. Further, the HP flexible slot server power supply may help in reducing downtime. Further, the breakout board 500, according to the present invention, may enable the HP flexible slot server power supply to be coupled to a Bitcoin miner, such as the processing device 102 (shown in FIG. 1). In another embodiment of the present invention, the power supply device 502 may be HP 800w, HP 1400w, and HP 1600w.

Figure 6:
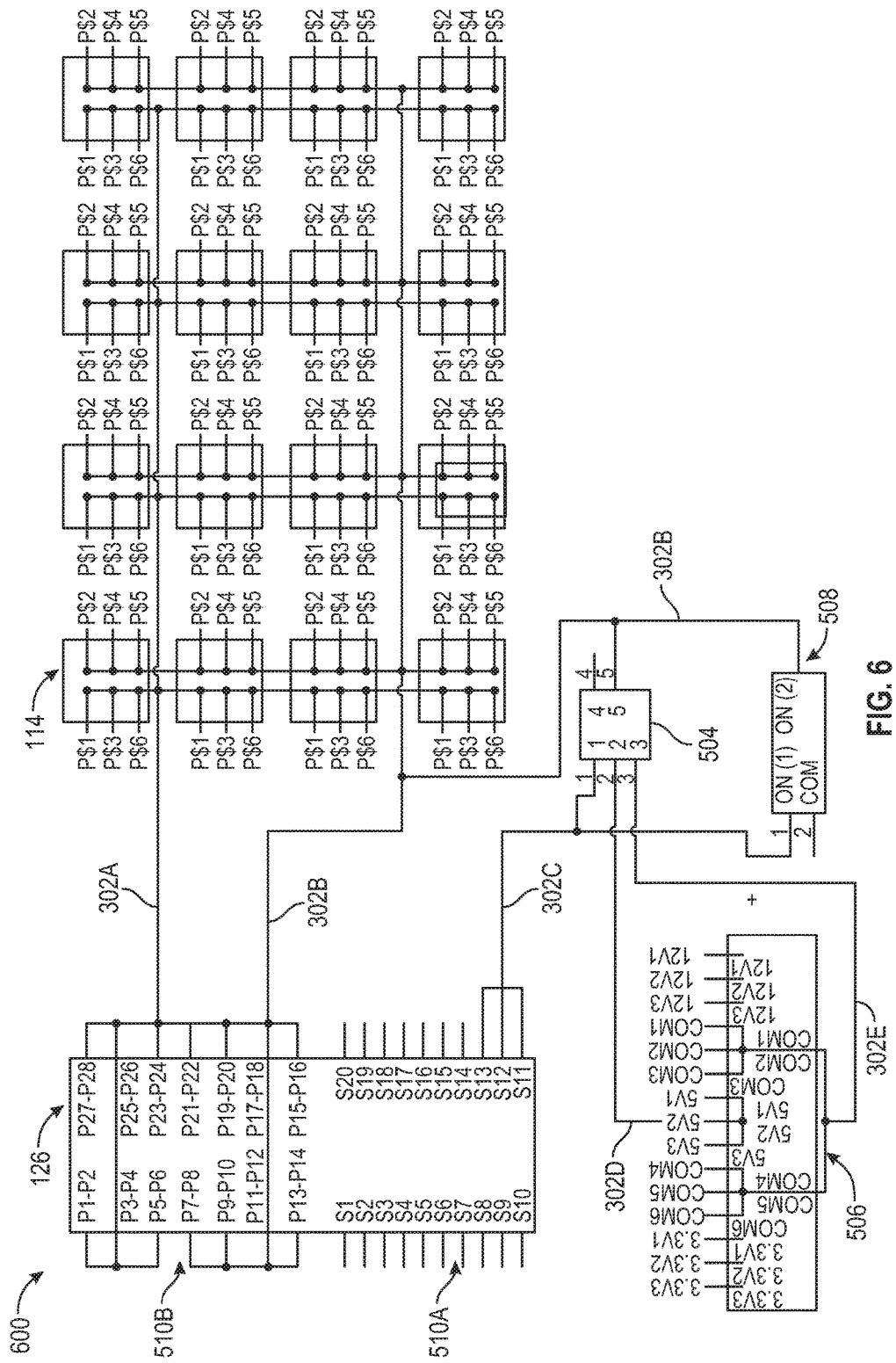
FIG. 6 illustrates a schematic view of the breakout board, in accordance with another embodiment of the present invention.

FIG. 6 illustrates a schematic view of a breakout board 600, according to an embodiment of the present invention. The slot connector 126 may include the first set 510A and the second set 510B of the slot pin receivers 206. In an embodiment of the present invention, the first set 510A may include ten slot pin receivers 206 on each side of the slot housing 202 and the second set 510B may include seven pair of slot pin receivers 206 on each side of the slot housing 202. Therefore, the first set 510A may include a total of twenty pins i.e. pins 51 to S20, while the second set 510B may include a total of twenty eight pins i.e. pins P1 to P28. Further, pins P1-P6 and pins P21-P28 of the second set 510B may be electrically connected to the bundle connectors 114 via a first conductive connection 302A. The first conductive connection 302A may represent conductive traces, soldered connections, conductive pads, or a combination thereof. Pins P7-P14 and pins P15-P20 of the second set 510B may be electrically connected to the bundle connectors 114 via a second conductive connection 302B. The second conductive connection 302B may represent conductive traces, soldered connections, conductive pads, or a combination thereof. In some embodiments, the unused pins of the first and the second set 510A and 510B may be used for any other processing of the breakout board 600.

The relay 504 may include five pins 1-5. Pin 1 of the relay 504 may be connected to pins S11-13 of the first set 510A of the slot connector 126 via a third conductive connection 302C. The third conductive connection 302C may represent conductive traces, soldered connections, conductive pads, or a combination thereof. Pins 2-3 of the relay 504 may be connected to the SATA power connector 506 via a fourth conductive connection 302D and a fifth conductive connection 302E. Each of the fourth conductive connection 302D and the fifth conductive connection 302E may represent conductive traces, soldered connections, conductive pads, or a combination thereof. Pin 5 of the relay 504 may be connected to pins P11-P12 and pins P15-P20 of the second set 510B of the slot connector 126 and the bundle connectors 114 using the second conductive connection 302B.

As shown in FIG. 6, the SATA power connector 506 may include fifteen pins, such as three +3.3V pins, three +5V pins, three +12V pins and six ground pins. In an embodiment of the present invention, one of +5V pin of the SATA power connector 506 may be connected to pin 2 of the relay 504 via the fourth conductive connection 302D. Further, at least two ground pins of the SATA power connector 506 may be connected to pin 3 of the relay 504 via the fifth conductive connection 302E. Further, the slider switch 508 may include three pins namely ON1, ON2 and COM. Pin ON1 may be connected to pin 1 of the relay 504 and pins S11-13 of the first set 510A via the third conductive connection 302C. Pin ON2 may be connected to pin 5 and pins P15-P20 and connectors 114 using the second conductive connection 302B.

As shown in the FIG. 6, three of the conductive pads of each of the bundle connectors 114 may be electrically connected to the first conductive connection 302A, while the other three conductive pads of each of the bundle connectors 114 may be electrically connected to the second conductive connection 302B. In some embodiments of the present invention, the three conductive pads of each of the bundle connectors 114 is provided with a positive DC voltage of 12 volts, as received from the power supply devices 502. Further, the other three conductive pads of each of the bundle connectors 114 is biased to ground. In an embodiment of the present invention, the ground may be determined by the power supply devices 502. Consequently, three conductive pads of each of the bundle connectors 114 may provide the positive DC voltage of 12 volts to the corresponding cables 108 electrically connected to them. Moreover, the other three conductive pads of each of the bundle connectors 114 may provide a ground voltage to the corresponding cables 108 electrically connected to them.

In some embodiments, certain slot pin receivers of the slot connector 126 may be directly connected to the bundle connectors 114 without any intermediate switches. Therefore, upon coupling the power supply device 502 to the slot connector 126, and the cables 108 to the bundle connectors 114 and the processing device 102, the power supply device 502 may provide electrical power to the processing device 102 via a breakout board, such as the breakout board 500 or the breakout board 600. Due to the absence of any intermediate switches (such as, restart buttons), power to the processing device 102 may be automatically turned back on in the event of a power failure and subsequent restoration of power. Further, in the absence of expensive and complicated components (such as, LED indicators) that can potentially malfunction, the breakout board 600 may be cost efficient and reliable.

In an embodiment, the body 124 of the breakout board 500 may be a Printed Circuit Board (PCB) that defines the electrical connections between the various components. In an exemplary embodiment, the slider switch 508 may enable the breakout board to be used in either "AUTO ON" mode or "SATA ON" mode. During "AUTO ON" mode, the breakout board 500 may be automatically turned ON if power is interrupted. The "AUTO ON" mode may be primarily used when ASIC's is used for mining. During "SATA ON" mode, a user may connect a regular desktop power supply to the server power supply breakout board to allow the server power supply to power on and off simultaneously. The "SATA ON" mode may be used when GPU is used for mining.

The article presented as part of the invention is not exclusive to the description above. Other related embodiments may be derived in accordance with the principles of the invention described above. Changes within the scope of current invention may be implemented by people skilled in the art.

The exemplary embodiments of this present invention have been described in relation to a breakout board for interfacing a processing device with a power supply device. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above.

Moreover, though the description of the present invention has included the description of one or more embodiments, configurations, or aspects and certain variations and modifications, other variations, combinations, and modifications are within the scope of the present invention, e.g., as may be within the skill and knowledge of those in the art, after understanding the present disclosure.

Each element in the embodiments of the present disclosure may be implemented as hardware, software/program, or any combination thereof.

Software codes, either in its entirety or a part thereof, may be stored in a non-transitory computer readable medium or memory (e.g., as a RAM, ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1A-19 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

A module that performs a function may also be referred to as being configured to perform the function, e.g., a data module that receives data also may be described as being configured to receive data. Configuration to perform a function may include, for example: providing and executing sets of computer code in a processor that performs the function; providing provisionable configuration parameters that control, limit, enable or disable capabilities of the module (e.g., setting a flag, setting permissions, setting threshold levels used at decision points, etc.); providing a physical connection, such as a jumper to select an option, or to enable/disable an option; attaching a physical communication link; enabling a wireless communication link; providing electrical circuitry that is designed to perform the function without use of a processor, such as by use of discrete components and/or non-CPU integrated circuits; energizing a circuit that performs the function (e.g., providing power to a transceiver circuit in order to receive data); and so forth.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed. Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

What is claimed is:

1. A breakout board for interfacing a power supply unit (PSU) with one or more devices, the PSU providing power to the one or more devices and comprising a plurality of pins having functions, the breakout board comprising:
    a body including conductive tracks;
    a slot connector having first and second pluralities of pin receivers disposed on the body,
        the first plurality of pin receivers corresponds to a first set of the plurality of pins on the PSU having power-on, power-off and ground functions, and
        the second plurality of pin receivers corresponds to a second set of the plurality of pins having functions of putting the PSU into a stand-by mode, wherein when the PSU is attached to the slot connector, and the first and second pluralities of pin receivers couple to the corresponding plurality of pins of the PSU;
    a plurality of bundle connectors disposed on the body for relaying the power from the PSU to the one or more devices, each of the plurality of bundle connectors having first and second pluralities of single connectors, wherein the first and second pluralities of pin receivers are coupled directly to the respective first and second pluralities of single connectors on the each of the plurality of bundle connectors;
    a second slot connector disposed on the body for interfacing a second PSU;
    a switch disposed on the body and coupled to the second set of the plurality of pins for switching the PSU between the stand-by mode and providing the power; and
    a relay disposed on the body and coupled to the slot connector and the second slot connector for switching the power to the plurality of bundle connectors between the PSU and the second PSU when the PSU is in the stand-by mode,
    wherein when the power is supplied from the PSU, after an interruption, the power from the PSU to the one or more devices is restored instantaneously without requiring a manual intervention.

2. The breakout board of claim 1, wherein the first plurality of pin receivers corresponds to a first set of a plurality of pins on the slot connector having the power-on, the power-off and the ground functions.

3. The breakout board of claim 1, wherein the slot connector electrically couples the first plurality of pin receivers to the first plurality of single connectors of the each of the plurality of bundle connectors.

4. The breakout board of claim 3, wherein the slot connector electrically couples the second plurality of pin receivers to the second plurality of single connectors to supply positive DC voltage from the PSU.

5. The breakout board of claim 4, wherein the positive DC voltage comprises 12 volts and the first and second pluralities of single connectors each comprises three single connectors.

6. The breakout board of claim 5, wherein the one or more devices comprise a separate PSU connection.

7. The breakout board of claim 1, wherein the body is a Printed Circuit Board and the plurality of bundle connectors is arranged in patterns selected from at least three rows of four bundle connectors and two rows of four bundle connectors.

8. The breakout board of claim 1, wherein the one or more devices comprise at least Bitcoin miner devices and computer graphic cards.

9. The breakout board of claim 1, wherein a recovery from the interruption is achieved without using a restart mechanism coupled to the body.

10. The breakout board of claim 1, wherein the interfacing is achieved without using visual indicators on the breakout board.

11. The breakout board of claim 1, wherein the one or more devices comprise Application-Specific Integrated Circuit (ASIC) devices, hash boards, and control boards.

12. The breakout board of claim 1, wherein the plurality of bundle connectors include electrical components to electrically connect to the conductive tracks of the body and the one or more devices using cables comprising Peripheral Component Interconnect (PCI) express cable.

13. The breakout board of claim 1, wherein the body is comprised of a non-conductive substrate and includes pads and through holes.

14. The breakout board of claim 1, wherein the first and second pluralities of pin receivers together comprise 64 pins formed in two parallel rows of 32 pins.

15. The breakout board of claim 1, wherein the second slot connector is a Serial Advanced Technology Attachment (SATA) power connector and the second PSU is an Advanced Technology EXtended (ATX) PSU.

* * * * *